United States Patent

Fassauer

[11] 4,318,241
[45] Mar. 9, 1982

[54] ANIMAL EXTERMINATION TRAP

[76] Inventor: Arthur L. Fassauer, 420 Foster La., Canyon, Tex. 79015

[21] Appl. No.: 70,647

[22] Filed: Aug. 28, 1979

[51] Int. Cl.³ .......................................... A01M 23/02
[52] U.S. Cl. .................................................. 43/58
[58] Field of Search ........................................ 43/58

[56] References Cited

U.S. PATENT DOCUMENTS

| 1,382,425 | 6/1921 | Kass | 43/58 |
| 1,858,096 | 5/1932 | Lementy | 43/58 |

FOREIGN PATENT DOCUMENTS

| 144575 | 6/1920 | United Kingdom | 43/58 |

Primary Examiner—Stephen G. Kunin
Assistant Examiner—J. T. Zatarga

Attorney, Agent, or Firm—Richards, Harris & Medlock

[57] ABSTRACT

An apparatus for exterminating animals such as rodents is provided. The apparatus includes an enclosure large enough to accommodate the body of the animal. An opening is formed in the enclosure to enable entry of the animal. Quantities of first and second chemical compositions are maintained separately from one another within the enclosure. In response to the entry of animals within the enclosure, the first and second compositions are mixed. Compositions react to one another when mixed to form a foam material having a volume substantially greater than the combined volumes of the first and second compositions. The foam fills the enclosure and surrounds and kills the animal. The foam hardens to encapsulate the animal, whereupon the device may be disposed of.

6 Claims, 6 Drawing Figures

ANIMAL EXTERMINATION TRAP

FIELD OF THE INVENTION

This invention relates to animal traps, and more particularly relates to a device and method for killing animals such as rodents.

THE PRIOR ART

The problems caused by animals such as rats, mice and other rodents are well known. Such rodents destroy great quantities of property and food, as well as serve as carriers for a variety of diseases.

Numerous devices have been heretofore developed in an attempt to kill or trap rodents. The simple spring trap is well known, and other devices such as elaborate electricution chambers have been heretofore developed. However, many such previously developed rodent traps have not been practical or desirable for use in a household environment due to the fact that the homeowner is hesitant to pick up the trap, disengage the killed rodent and throw the rodent away. Moreover, such prior traps may in some cases be somewhat dangerous when rodents bearing fleas or other vermin are killed by the trap. When rodents are killed by such traps, the fleas and other vermin often leave the rodent and seek a new home, which in some cases may be the homeowner attempting to dispose of the killed rodent.

A need has thus arisen for an animal exterminating trap which is effective, but yet which eliminates messy disposal of the rodent and which also prevents vermin and germs from leaving the body of the rodent and escaping into the household or other environment.

SUMMARY OF THE INVENTION

The present invention provides an apparatus and a method for exterminating rodents and other animals which eliminates or substantially reduces the problems heretofore associated with prior devices.

In accordance with the present invention, an animal trap is provided which includes an enclosure having an opening defined therein for admitting an animal into the enclosure. Structure is responsive to the entry of the animal into the enclosure for introducing a foam substance into the enclosure for killing and encapsulating the animal.

In accordance with a more specific aspect of the present invention, an animal trap is provided which includes an enclosure dimensioned to accommodate the body of an animal. An opening is defined in the enclosure to enable the animal to enter the enclosure. Quantities of first and second compositions are maintained separately from one another in association with the enclosure. The first composition reacts with the second composition when mixed therewith to form a foam material having a volume greater than the combined volumes of the quantities of the first and second compositions. The foam material hardens after a predetermined time interval. Structure is responsive to the entering of an animal within the enclosure for causing mixing of the first and second compositions such that the space between the enclosure and the animal is filled with foam which hardens to kill and encapsulate the animal.

In accordance with yet another aspect of the invention, a method of extermination includes combining first and second compositions separately from one another. The first composition reacts with the second composition when mixed to form a foam material having a volume substantially greater than the combined volumes of the first and second compositions. The foam hardens within a prescribed time period. The first and second compositions are mixed within the enclosure in response to the presence of an animal within the enclosure in order to fill the enclosure with foam to exterminate and encapsulate the animal.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
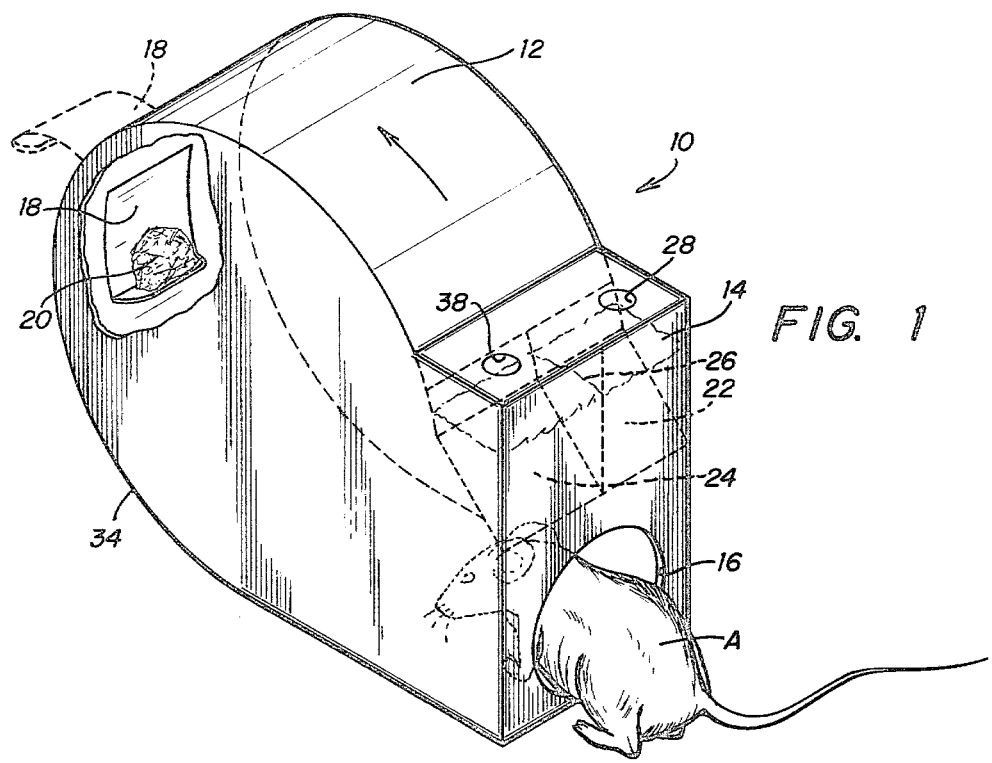
FIG. 1 is a perspective view illustrating a preferred embodiment of the present animal trap.

FIG. 1 is a perspective view of the present animal trap which is identified generally by the numeral 10. As may be seen, the trap includes a cylindrical body 12 and an integral rectangular portion 14. The body 12 is hollow and may be entered through an entrance 16. The entrance 16 is dimensioned to allow the entry of an animal A desired to be trapped, which in the preferred embodiment is a rodent such as a mouse or a rat.

On the rearward side of the body 12 is a pivotable flap 18 which may be moved from a closed position as illustrated to an open position indicated by the dotted line position. A suitable bait 20 such as cheese or the like may be implanted upon the flap 18 in its open position and the flap closed to present the bait as illustrated by the dotted line. Because the body 12 encloses the bait, the smell of the bait is concentrated at the entrance 16. The presence of the bait causes the animal A to enter through the entrance 16 and approach the bait. Once the animal A enters, the curved sides of the body 12 prevent the animal from eating through the walls of the body.

Rectangular portion 14 includes two compartments 22 and 24 which are separated by a partition 26. Liquids or other compositions may be introduced into the compartments through apertures 28 and 30 when the trap is in the upright position shown in FIG. 1.

A first substance or composition is deposited in compartment 22 and a second substance or composition is deposited in compartment 24. The two compositions are maintained separately from one another by the partition 26. The first and second compositions are chosen such that they react when mixed together to form a foam material having a volume substantially greater than the combined volumes of the quantities of the first and second compositions. The volume of the resulting foam is great enough to substantially fill the interior of the housing 12 in order to kill the animal A.

There are numerous compositions suitable for use with the present invention. For example, the two compositions used with the present invention when mixed together can form a foamed resin without the need for mechanical agitation or application of heat. Thus, gas should be released upon mixture of the two components so that a foaming action will occur followed by setting of the foamed resins into a hard mass. The components used with the present invention may be any one of a number of two phased gas solid systems in which the solid is a synthetic plastic or rubber and the solid phase is substantially continuous.

One example of such a two component system includes a polyhydroxy component which is reacted with enough polyisocyanate to result in the formation of a prepolymer with isocyanate end groups plus excess isocyanate. The second component in accordance with this aspect of the invention is water, which when mixed with the first component simultaneously releases carbon dioxide for expansion and therefore links the polymer chains together in a cross-linked matrix. Other components which produce polyurethane foams by the prepolymer process may also be used with the invention.

In another embodiment of the invention, a source of compressed gas may be located in the body 12 and released during mixing of the two compositions in order to create large volumes of foamed plastic material. In yet another aspect of the invention, poison may be contained in the compartments 22 and 24 and allowed to spill out into enclosure 12 upon entry of the animal. The poison may kill the animal by ingestion or by breathing into the animal's respiratory system. The poison may also chemically retard any smell caused by decay of the animal.

Figure 2:
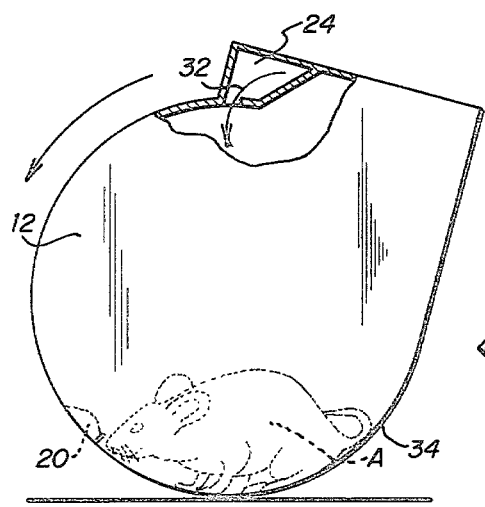
FIG. 2 is a partially broken away view of the trap shown in FIG. 1 after entry of an animal.

FIG. 2 illustrates a side view of the compartment 24 and illustrates an opening 32 which communicates between the compartment 24 and the interior of the housing 12. Compartment 22 is formed in an identical manner. When the animal A enters the housing as shown in FIG. 1 and walks toward the bait 20, the curved bottom surface 34 of the housing 12 causes the housing 12 to rotate to the position shown in FIG. 2. In this position, the compositions within the compartments 22 and 24 flow downwardly into the housing 12. If desired, suitable baffles may be provided to aid in the mixing of the first and second compositions. The mixing of the two compositions causes the creation of a substantial amount of foam material which fills the interior of the housing 12.

Figure 3:
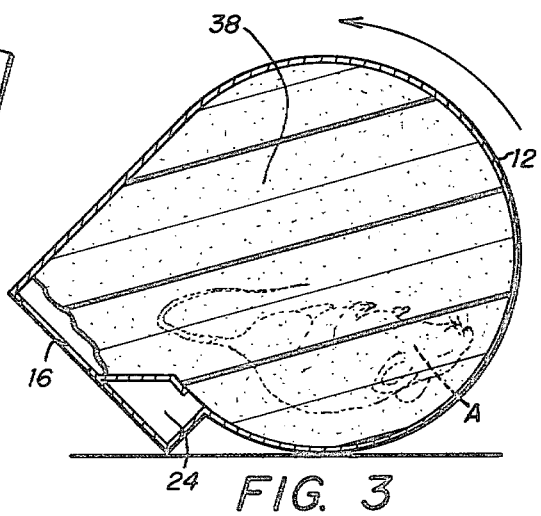
FIG. 3 is a sectional view of the trap shown in FIG. 1 after encapsulation of the animal.

FIG. 3 illustrates how the foam material 38 completely or substantially fills the interior of the housing 12 and kills the animal A by suffocation. The foam material 38 hardens after a time period and therefore permanently encapsulates the animal A within the housing 12. This provides a very easy to dispose of device, without the houseowner having to see the dead animal. In addition, because the animal is encapsulated, the animal will not rapidly decompose and therefore undesirable odors and the like are eliminated. Moreover, any bacteria, germs or fleas or the like on the animal A will be encapsulated with it and will also die and cannot escape. Thus, the present trap is not only effective in killing the animal but also prevents the release of undesirable diseases or other pests after the animal is dead.

Figure 4:
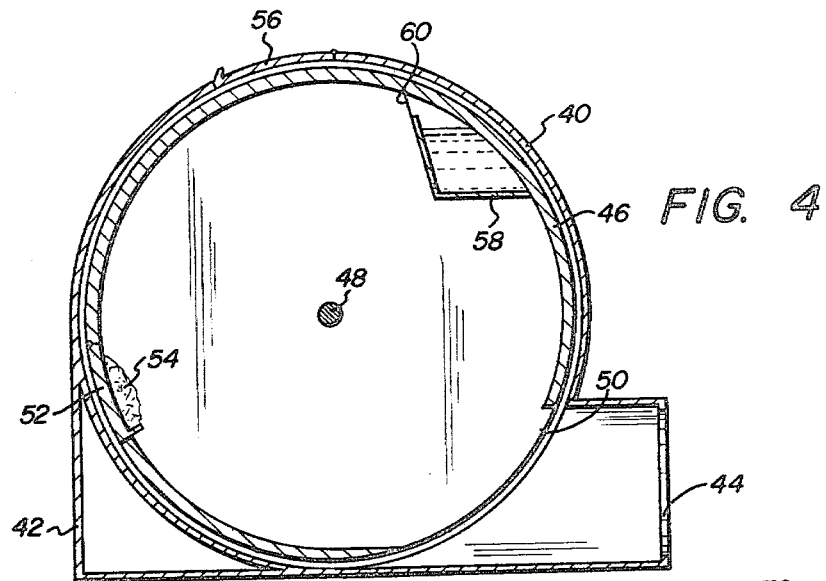
FIG. 4 is a sectional view of a second embodiment of the present invention.

FIG. 4 illustrates a second embodiment of the present invention. In this invention, a housing 40 is provided which is substantially the same configuration as the animal trap 10 as shown in FIG. 1. In this embodiment, a square edge 42 is provided so that the exterior of housing 40 cannot rotate upon entry of the animal. An entryway 44 is provided in the housing 40 to allow entry of the animal. An interior rotatable housing 46 is rotatably mounted within the housing 40 on a pivot pin 48. Interior housing 46 is a cylindrical housing with an opening 50 therein to allow admission of the animal. A movable food door flap 52 is provided in the interior housing in order to flip out in order to have bait 54 placed therein. A doorway 56 is provided in the outer housing 40 to allow access to the opening 50.

Two compartments 58, one of which is not shown, are disposed in the interior housing 46 for containing the two compositions in accordance with the invention. An aperture 60 is disposed in the upper portion of each of the compartments.

In operation, the animal A senses the bait 54 and enters through the entryways 44 and 50. Movement of the animal toward the bait 54 causes rotation of the interior housing 46 about the pivot 48. Rotation of the interior housing 46 causes the composition within the compartment 58 to spill out of the aperture 60 and mix with the second composition in the other separated compartment. Mixture of the two compositions causes the generation of a substantial amount of foam which substantially fills the interior of the interior housing 46. This causes suffocation of the animal in the manner previously described.

Figure 5:
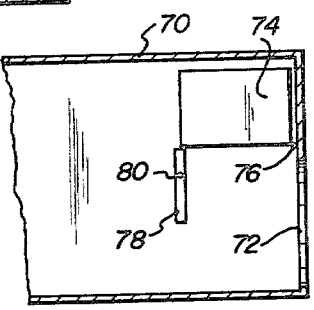
FIG. 5 is a sectional view of a third embodiment of the present invention.

FIG. 5 is a third embodiment of the present invention which utilizes a stationary housing 70. Housing 70 includes an entranceway 72 to provide admission of the animal therethrough. A pair of compartments 74 are pivotally mounted at pivot point 76 to the interior wall of the housing 70. The two compositions of the present invention are stored in compartment 74 in separated compartments when the compartments are in the illustrated horizontal position. A lever 78 is pivotally mounted at pivot point 80. When the lever 78 is in the illustrated vertical position, the compartments 74 are maintained in a horizontal position. When the animal enters through the entranceway 72 to search for the bait in the housing 70, the animal hits lever 78 and causes the lever to pivot. This allows the compartment 74 to pivot downwardly around the pivot point 76, thereby spilling out the first and second compositions stored therein. The two compositions are then mixed to create the foam of the present invention in order to kill the animal.

Figure 6:
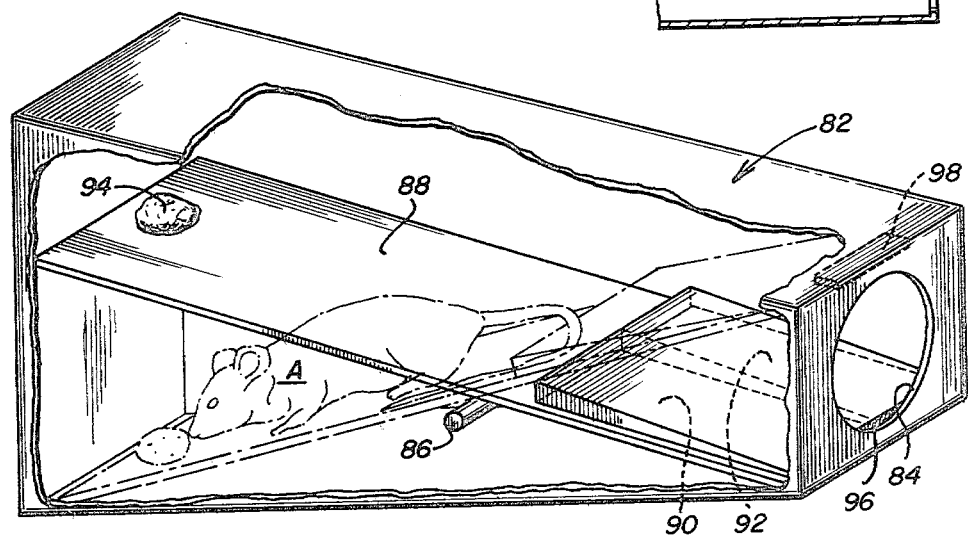
FIG. 6 is a sectional view of a fourth embodiment of the present invention.

FIG. 6 is a fourth embodiment of the present invention and includes a stationary housing 82 which includes an opening 84 to allow entrance of an animal A. A rod 86 is fixedly horizontally mounted across the side walls of the housing 82. A platform 88 is disposed over the rod 86. In the normal position illustrated by the solid lines, the end of the platform 88 is disposed below the opening 84.

Compartments 90 and 92 are mounted above the platform 88 and store the first and second compositions of the present invention. In operation, the animal enters the entranceway 84 in search of the bait 94. The weight of the animal causes the platform 88 to move to the dotted line position much in the manner of a seesaw. In this position, the end of the platform 88 moves upwardly above the entranceway 84. This movement of the platform 88 causes the compositions stored within the compartments 90 and 92 to flow outwardly and be mixed together. A mixture of the first and second compositions thus creates a substantial amount of foam which operates to kill and encapsulate the animal in the manner of the invention. A Velcro strip 96 is mounted on the end of platform 88. Strip 9 mates with Velcro strip 98 which is mounted above opening 84. When the trap is sprung by the animal, the strips 96 and 98 meet and stick together to prevent escape of the animal and to form a seal conducive of suffocating the animal. The platform 88 can also be spring loaded in order to facilitate trapping of the animal.

Whereas the present invention has been described with respect to specific embodiments thereof, it will be understood that various changes and modifications will be suggested to one skilled in the art, and it is intended to encompass such changes and modifications as fall within the scope of the appended claims.

I claim:

1. An animal trap comprising:
    an enclosure dimensioned to accommodate the body of an animal;
    structure defining an opening in said enclosure to enable the animal to enter said enclosure;
    quantities of first and second compositions being maintained separately from one another within said enclosure;
    said first composition reacting with said second composition when mixed therewith to form a foam material having a volume greater than the combined volumes of said quantities of said first and second compositions which hardens after a predetermined time interval; and
    means responsive to the entering of an animal within said enclosure for causing mixing of said first and second compositions within said enclosure to fill the space between said enclosure and the animal with foam which hardens to prevent escape of the animal and results in the death of the animal through asphyxiation.

2. The animal trap of claim 1 wherein said foam hardens after a predetermined time period to encapsulate the animal.

3. The animal trap of claim 1 wherein said means for causing mixing comprises a mechanical switch member movable as the animal enters said enclosure.

4. The animal trap of claim 1 wherein said enclosure is configured to move from a first position to a second position by the weight of an animal entering said enclosure, said first and second compositions being maintained in said enclosure for mixing together when said enclosure is in said second position.

5. The animal trap of claim 4 wherein said first and second compositions are stored in separate compartments within said enclosure, said compartments having openings into the enclosure which are maintained in an upward location when said enclosure is in said first position, said openings being moved downwardly when said enclosure is moved to said second position in order to allow said first and second compositions to flow through said openings and mix together within said enclosure.

6. The animal trap of claim 4 wherein said enclosure comprises an outer stationary housing defining an opening therethrough and an inner rotatable housing mounted within said outer stationary housing and defining an opening aligned with the opening in said outer stationary housing in the first position to enable the animal to enter said enclosure.

* * * * *